United States Patent [19]

Peterson

[11] 4,374,488
[45] Feb. 22, 1983

[54] WHEY FILTER

[75] Inventor: Harold J. Peterson, Iowa County, Wis.

[73] Assignee: Farmers Pride Cheese, Inc., Arena, Wis.

[21] Appl. No.: 250,921

[22] Filed: Apr. 6, 1981

Related U.S. Application Data

[63] Continuation of Ser. No. 81,004, Oct. 1, 1979, abandoned.

[51] Int. Cl.³ .................... A01J 25/00; A01J 25/11; A23C 19/02
[52] U.S. Cl. .................................. 99/459; 99/465; 99/466; 210/512.1
[58] Field of Search ............... 99/452, 453, 456, 458, 99/459, 460, 465, 466; 426/491, 495; 210/512.1, 512.2, 512.3

[56] References Cited
U.S. PATENT DOCUMENTS

| | | | |
|---|---|---|---|
| 881,781 | 3/1908 | Eastman | 99/459 |
| 2,107,040 | 2/1938 | Lomax | 426/495 |
| 2,251,684 | 8/1941 | Lomax | 426/495 |
| 2,528,094 | 10/1950 | Walker | 210/512 R |
| 2,539,019 | 1/1951 | Hill | 210/512 R |
| 3,535,784 | 10/1970 | Krueger et al. | 99/458 |
| 4,044,662 | 8/1977 | Savarese | 99/465 |

Primary Examiner—Philip R. Coe
Assistant Examiner—Timothy F. Simone
Attorney, Agent, or Firm—Isaksen, Lathrop, Esch, Hart & Clark

[57] ABSTRACT

A whey filter for removing fine curd particles from a stream of cheese whey includes a mesh screen (30) suspended in a cylindrical portion (17) of a tank (18) with cheese whey being introduced above the screen (30) through inlet ports (36) arranged to direct the cheese whey in a path tangential to the periphery of the circle of the screen (30). A plurality of scraper blades (38) rest on the screen (30) and are rotated by the flow of the cheese whey so as to urge the curd particles resting on top of the screen (30) toward a hole (44) in the center of the screen (30) so that the curd falls into an outlet chute (46) while the whey is removed from the bottom of the tank (18).

12 Claims, 3 Drawing Figures

WHEY FILTER

This is a continuation, of application Ser. No. 081,004, filed Oct. 1, 1979, abandoned.

TECHNICAL FIELD

The present invention relates to solid-liquid filtering devices in general, and, in particular, to devices specially adapted to removing fine particles of cheese curd from a liquid stream of cheese whey exiting from a cheese making vat.

BACKGROUND OF THE PRIOR ART

The prior art is generally cognizant of devices particularly designed to separate particles of cheese curd from cheese whey. In making cheese, a precipitate, or "curd", is developed in the milk, after which the remaining liquid section of the milk, termed "whey", is drawn off the curd. These separation devices are generally designed either to initially remove the whey from the curd, or to separate further fine particles of cheese curd from the whey after the whey has been drawn off the main body of curd, in order to achieve an efficiency in the cheesemaking process.

It is known, for example, in the prior art that a screen may be utilized to separate whey from curd particles. Examples of the use of such screens may be seen in U.S. Pat. Nos. 3,695,893 and 3,887,718. Several examples are known of devices which use cylindrical rotating screenlike devices to separate curd from whey. Examples of devices of that type are shown in U.S. Pat. Nos. 2,807,608, 3,368,278, and 4,156,384. Another cheese curd-whey separating device utilizing a screen is shown in U.S. Pat. No. 3,535,784. In addition, the general use of a screen suspended over a tank of fluid for use in connection with dairy products, is shown in U.S. Pat. No. 93,582. Another example is known, that shown in U.S. Pat. No. 3,019,527 of a cheese manufacturing machine including therein a perforated false bottom for use in squeezing the whey out of the curd during the cheese making process. The general use of rotating scrapers above a filter member having numerous holes therein is shown in U.S. Pat. No. 2,107,040 in connection with a process for filtering eggs.

BRIEF SUMMARY OF THE INVENTION

The present invention is summarized in that a whey filter includes a tank having a cylindrical portion therein; an outlet to remove the whey from the tank; a mesh screen positioned in the cylindrical portion of the tank, the screen being of circular shape so as to extend completely across the cylindrical portion of the tank; and at least one whey inlet above the screen, the inlet oriented so as to direct the input whey in a trajectory generally tangential to the periphery of the screen so that the whey tends to filter through the screen and curd particles tend to remain above the screen and be forced toward the center thereof.

It is an object of the present invention to construct a whey filter for separating fine particles of cheese curd from whey which operates as simply and as efficiently as is practical.

It is another object of the present invention to provide such a whey filter which has a minimum number of moving parts so as to be economical in its construction and efficient in its operation.

It is a feature of the present invention in that it requires the input of no energy in its operation other than the energy contained in the whey as it is pumped into the whey filter.

Other objects, features, and advantages of the present invention will become apparent from the following specification when taken in conjunction with the accompanying drawings.

DETAILED DESCRIPTION OF THE PREFERRED EMBODIMENT

Figure 1:
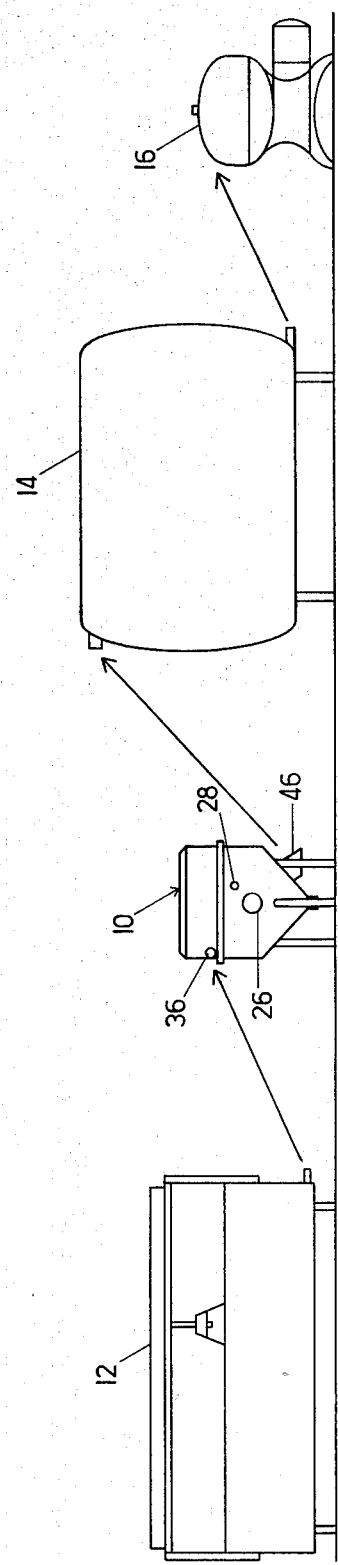
FIG. 1 is a schematic view of a cheese making process utilizing therein the whey filter constructed in accordance with the present invention.

Shown in FIG. 1 is a schematic flow diagram of a cheese making process incorporating therein a primary whey filter, generally indicated at 10, constructed in accordance with the present invention. In the cheese making process illustrated in FIG. 1, the curd is precipitated from the milk, the curd is salted and cut, and the whey is drawn off, all in a cheese cooking vat 12. Whey is drawn off from the cheese cooking vat 12 and is actively pumped into the whey filter 10. Curd particles recovered by the whey filter 10 are returned to the cheese cooking vat 12 while the whey exiting from the whey filter 10 is pumped into a whey storage tank 14. Whey is accumulated in the whey storage tank 14 until a sufficient quantity accumulates after which the whey in the storage tank 14 is run through a whey cream separator 16 to separate out any remaining cream fraction from the whey before it is disposed of. Alternately, the whey filter 10 may be interposed between the whey storage tank 14 and the whey cream separator 16.

Figure 2:
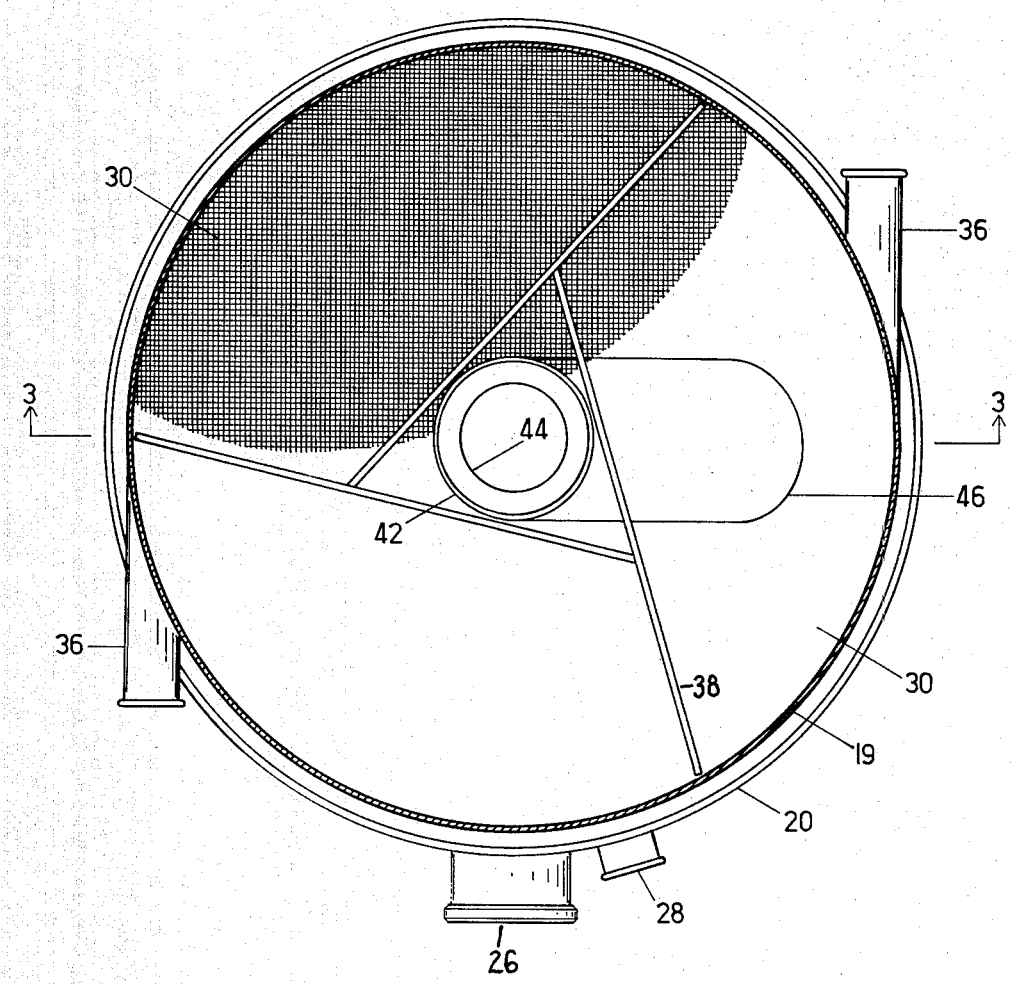
FIG. 2 is a top plan view of a whey filter constructed in accordance with the present invention with the top of the tank cover removed.
Figure 3:
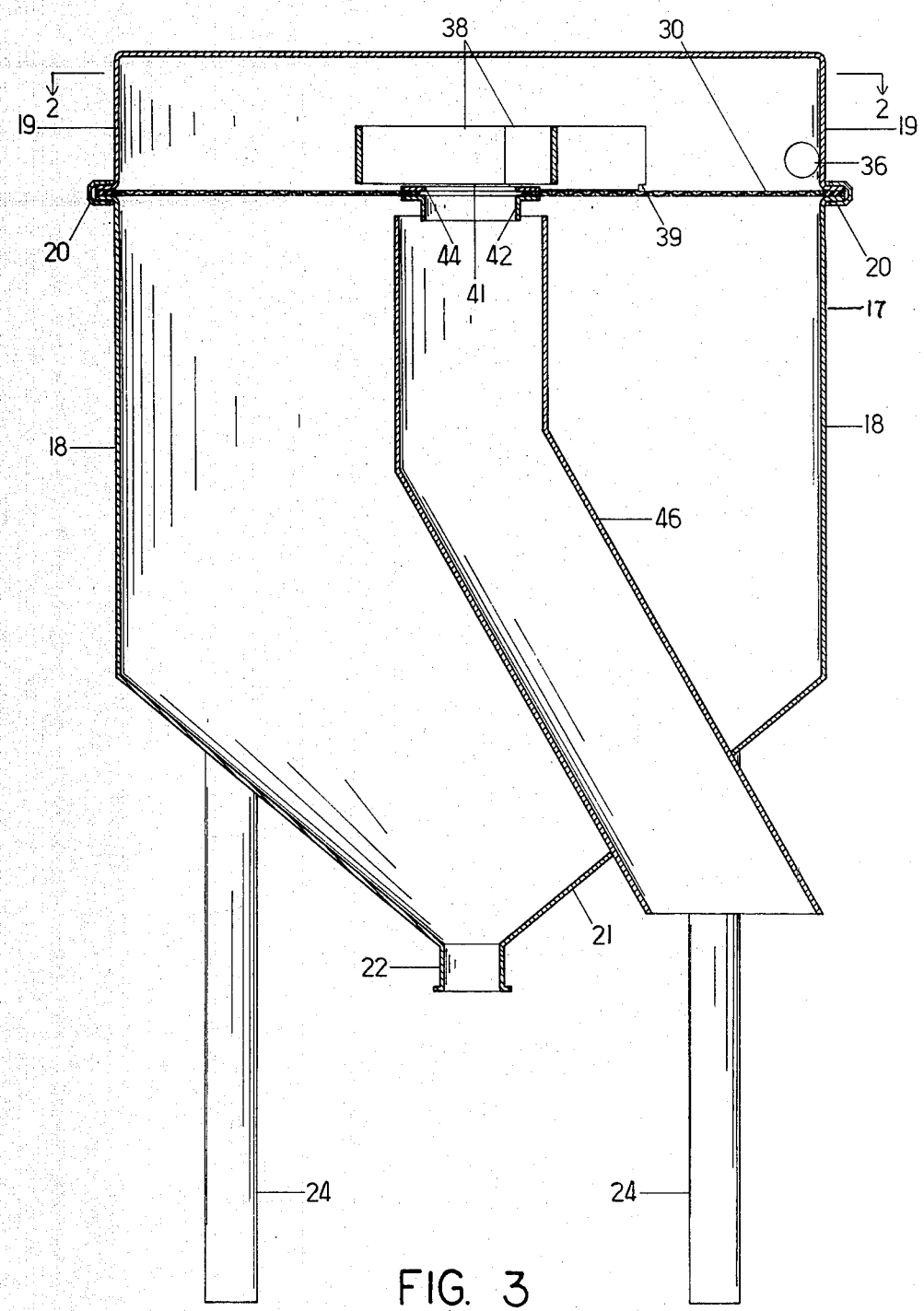
FIG. 3 is a cross-sectional view taken generally along the lines 3—3 indicated in FIG. 2, with the top of the tank cover replaced.

Shown in FIGS. 2 and 3 are the details of the construction of the whey filter 10. The body of the whey filter 10 is generally formed by a stationary balance tank 18 and a tank cover 19. The tank cover 19 includes a planar, circular top plate on top of a cylindrical section, with the bottom edge of the cylindrical section including an outturned flare. The balance tank 18 includes an upper cylindrical portion 17 resting on a conically shaped section 21 which tapers downward to a whey outlet 22 formed at the apex of the cone of the conical section 21. An out-turned flare is provided at the upper edge of the cylindrical section 17 of the tank 18. A peripheral clamping 20 is provided to secure the tank cover 19 to the balance tank 18 by clamping together the flares provided on their respective lower and upper edges. The whey outlet 22 is provided with suitable coupling means so as to be detachably coupled to other suitable fluid handling equipment for handling the whey. Formed attached to the whey filter 10 are a plurality of supporting legs 24, of which there are three in the embodiment described herein, which serve to hold the whey filter 10 in its erect vertically oriented position as shown in FIGS. 1–3. On the exterior of the cylindrical portion 17 of the balance tank 18, a viewing port 26 is formed. The viewing port 26 includes a window of transparent sheet material mounted at the end of a cylindrical extension formed extending radially outward from the side of the balance tank 18. The viewing port 28 is provided so that a viewer on the outside of the balance tank 18 may view into the interior of the whey filter 10 to see the liquid level of the whey therein. Located also on the outside of the balance tank 18 of the whey filter 10 above the viewing port 26 is an exhaust vent 28 which opens from the interior of the balance tank 18 into the outside atmosphere.

Suspended inside and at the top of the cylindrical portion 17 of the balance tank 18 of the whey filter 10 is a stainless steel mesh screen 30. The mesh screen 30 is positioned in a horizontal position across the top of the balance tank 18 and is fixed in place in quiescent relation by having its peripheral edge pinched between the flares on the balance tank 18 and the tank cover 19 which are pinched together by the clamp 20. The screen 30 is preferably of about 200 mesh. The peripheral edge of the screen 30 may be coated with rubber or a similar synthetic material so that that edge of the screen 30 forms a fluid seal between the balance tank 18 and the tank cover 19. A pair of whey inlet ports 36 are provided at diametrically opposite sides of the cylindrical portion of the tank cover 19 just above the screen 30. As can be seen in FIG. 2, the whey inlet ports 36 are oriented so that their central axes are generally tangential to the periphery of the circle described by the screen 30. The whey inlet ports 36 are positioned so that they are just slightly above the screen 30. Positioned resting on top of the screen 30 and freely rotatable thereon are scraper means comprising three movable scraper blades 38. Each of the scraper blades 38 extents generally radially outward relative to the circle of the screen 30. The three scraper blades 38 are fixed together in a triangular arrangement about the center of the screen 30, as can be best seen in FIG. 2. Each of the scraper blades 38 has a notch 39 formed along its lower edge adjacent the outer end thereof and another, longer motch 41 formed along the lower edge of its inner end so as to allow material to pass under the scraper blades 38 near the center of the screen 30. Positioned in the center of the screen 30 is an annular collar 42 which surrounds and defines a hole 44 in the screen 30. The hole 44 and the collar 42 are located in the center of the circle of the screen 30. Positioned directly below the collar 42 is a curd outlet chute 46 which extends vertically downward and then is canted outward away from the center of the whey filter 10 and extends outward through the conical portion 21 of the tank 18 to the exterior of the whey filter. Suitable brackets 48 are provided to hold the curd outlet chute 46 in position in the tank 18.

While the component parts of the whey filter 10 as described in FIGS. 1-3 may be constructed of any of a variety of rigid sanitary materials, it is preferred that the whey filter 10 be largely constructed of stainless steel such as is commonly used in the dairying industry for the handling and processing of dairy products. It is preferable nevertheless that the scraper blades 38 be formed of a relatively light synthetic resin for reasons that will become apparent below.

In its operation, the whey filter 10 of FIGS. 1-3 is intended to remove fine curd particles from the whey stream exiting from a cheese cooking vat such as that indicated at 12 in FIG. 1. In preparing cheese from whole milk, it is common practice to coagulate a curd from the milk leaving a watery constituent of the milk referred to as the "whey" which is drawn off the curd as the processing of the cheese is continued. After the initial whey is drawn off, the curd is commonly cut, as with knives, to release more whey therefrom. As the initial whey, and the whey created by the cutting of the curd, is drawn off it carries some fine particles of curd therewith. These fine particles of curd are thus carried off in what is otherwise an uneconomical waste product, i.e. the whey, and it is therefore highly economically desirable that they be recovered and added to the bulk of the curd for processing into cheese. The whey filter 10 of FIGS. 1-3 is designed to quickly, efficiently, and economically recover a significant fraction of the fine curd particles from the whey as it exits from the cheese cooking vat.

The whey is injected into the whey filter 10 under pressure from pumps through the whey inlet ports 36. Thus the whey enters the whey filter 10 just above the screen 30 and at a velocity and direction generally tangential to the periphery of the circle of the screen 30. The interaction of the whey entering the whey filter 10 with the inside of the tank cover 19 causes the whey to be subjected to a swirling action. The whey then tends to fall through the screen 30 leaving the fine curd particles on the top surface of the screen 30. The whey falls down into the balance tank 18 of the whey filter 10, then passes downward through the conical portion 21 of the tank 18 and out through the whey outlet port 22, after which it is pumped by suitable fluid handling equipment into the whey storage tank 14.

The injection of the whey through the whey inlet ports 36 under pressure also causes the whey to hit the scraper blades 38. The pressure of this contact causes the scraper blades 38 to slowly rotate as an assembly as they are pushed by the whey and this rotation causes the scraper blades 38 to continually scrape across the top surface of the screen 30. It is to facilitate this scraping that the scraper blades are constructed of relatively light materials. This scraping removes the curd particles resting on top of the screen 30 and causes them to accumulate in front of the scraper blades 38 as they rotate. As the whey is constantly being injected onto the periphery of the screen 30, fluid pressure causes the curd to tend to be forced inwardly. The triangular assemblage of the scraper blades 38 also encourages the curd particles to be forced inwardly toward the center of the screen 30 until ultimately the curd particles drop through the hole 44 provided in the center of the screen 30. The curd particles entering the hole 44 fall through the curd outlet chute 46 into a suitable vessel provided for their recovery. The passage of the curd particles across the screen 30 toward the hole 44 is particularly encouraged by the fact that each of the blades 38 is arranged generally tangential to the hole 44 and is rotating about that hole. Thua as curd particles build up in front of the scraper blades 38, they are continually pressed by their own mass inwardly toward the hole 44.

The viewing port 26 is provided so that the level of the whey in the tank 18 may be monitored. In some applications it may be desired to omit the storage tank 14, and connect the whey outlet 22 from the tank 18 to the whey cream separator 16. In such a set-up, the tank 18 is used as a balance tank to provide a proper fluid pressure to the separator 16 and the level of fluid in the tank 18 must be monitored to maintain that desired level. The viewing port 26 is also useful in ensuring that the tank 18 is not overfilled with whey.

The exhaust vent 28 serves to ensure that the air pressure on the interior of the tank 18 does not vary too far from atmospheric pressure. If a negative pressure were to develop inside of the tank 18, some curd particles might be pulled through the screen 30 while if a positive pressure were to develop, the whey might remain on top of the screen 30 also. The exhaust vents 28 opens the interior of the tank 18 to the atmosphere to avoid both these problems.

It is also envisioned, if desired, that the scraper means could be rotated independent of the force of the whey stream by a small electric motor. Such a motor may be desirable if the fluid handling equipment used to transport the whey to the whey filter 10 is not capable of forcing it into the whey filter 10 under high pressure.

An equally effective, though somewhat less convenient, embodiment of my whey filter may be provided which is even simpler than the embodiment illustrated in the drawings and described above. Such a construction would employ a continuous screen with no center hole, and would have no scraper means or curd outlet chute. The fine curd particles which are retained on the screen tend to be washed toward the center of the screen by the tangential peripheral flow of the whey. As the quantity of curd particles builds up, the curd particles may be manually removed and returned to the cheese vat or other holding vessel. The curd particle build up is gradual and normally requires only periodic removal. They whey may also be directed onto the screen by any tangential delivery means located above the screen, such as one or more pipes with elbows which are located directly over the screen near its periphery and in close proximity to the screen, and oriented to direct the flow of incoming whey parallel to the screen and approximately tangential to its exposed periphery in approximately the same manner as the whey inlet ports 36. The simplified structure described above has no moving parts, but is nonetheless fully effective and entirely practical for commercial installations.

It is understood that the present invention is not limited to the particular construction and arrangement of parts disclosed and illustrated herein, but embraces all such modified forms thereof as come within the scope of the following claims.

I claim:

1. A filter for removing fine particles of cheese curd from liquid whey comprising:
   a stationary tank (18) having a substantially vertically extending cylindrical portion therein;
   a mesh screen (30) transversely positioned in the cylindrical portion of the tank (18), the screen (30) being of circular shape so as to extend completely across the cylindrical portion of the tank (18) and being maintained in quiescent relation by fixed engagement with the tank (18);
   at least one inlet (36) for introducing whey with fine curd particles into the tank (18) just above the screen (30), the inlet (36) oriented so as to direct the input whey in a trajectory generally tangential to the periphery of the screen (30) so that the whey tends to filter downwardly through the screen (30) and the curd particles tend to remain above the screen (30) and be forced toward the center thereof by the tangential flow of whey on the screen; and
   an outlet (22) in the lower portion of the tank (18) below the screen (30) for discharging whey from the tank (18).

2. A whey filter as claimed in claim 1 wherein two whey inlets (36) are arranged on diametrically opposite sides of the screen (30).

3. A whey filter as claimed in claim 1 wherein the whey fitler includes a balance tank (18) and a tank cover (19) with the screen (30) positioned therebetween.

4. A whey filter as claimed in claim 3 wherein the whey inlet (36) is at least one port formed in the tank cover (19).

5. A whey filter as claimed in claim 3 wherein an outturned flare is formed in the lower and upper edges of the tank cover (19) and the balance tank (18) respectively and wherein a clamping (20) holds the two flared edges together to secure the tank cover (19) and the balance tank (18) together.

6. A whey filter as claimed in claim 5 wherein the screen (30) is held between the flares on the tank cover (19) and the balance tank (18).

7. A whey filter as claimed in claim 1 wherein a viewing port (26) is provided on the tank (18) so that the interior of the tank (18) may be viewed.

8. A whey filter as claimed in claim 1 wherein an exhaust vent (28) is provided in the tank (18).

9. A filter for removing fine particles of cheese curd from liquid whey comprising:
   a stationary tank (18) having a substantially vertically extending cylindrical portion therein;
   a mesh screen (30) transversely positioned in the cylindrical portion of the tank (18), the screen (30) being of circular shape so as to extend completely across the cylindrical portion of the tank (18) and also having a hole (44) defined in its center, the screen (30) being maintained in quiescent relation by fixed engagement with the tank (18);
   at least one inlet port (36) for introducing whey with fine curd particles into the tank (18) just above and tangential to the periphery of the screen (30) such that curd particles retained on the screen (30) will be forced inwardly from the periphery of the screen (30) toward the center of the screen (30) by the tangential flow of whey on the screen;
   rotatable scraper means (38) positioned on top of the screen (30) for urging curd particles retained on top of the screen (30) toward the hole (44) in the center thereof;
   curd outlet means (46) associated with the hole (44) in the screen (30) for conducting curd entering the hole (44) in the screen (30) out of the tank (18); and
   a whey outlet (22) in the lower portion of the tank (18) below the screen (30) for discharging whey which passes through the screen (30) from the tank (18).

10. A whey filter as claimed in claim 9 wherein the curd outlet means includes an outlet chute (46) positioned under the hole (44) in the screen (30) and extending outwardly of the tank (18) for conducting curd to the exterior of the tank.

11. A whey filter as claimed in claim 9 wherein the scraper means includes three scraper blades (38) joined together in a triangular screen assembly centered around the hole (44) in the screen (30).

12. A whey filter as claimed in claim 9 wherein the force of the whey entering the whey filter causes the scraper means (38) to rotate.

* * * * *